United States Patent
Gentieu et al.

(10) Patent No.: US 8,769,152 B2
(45) Date of Patent: Jul. 1, 2014

(54) ALIGN/NOTIFY COMPRESSION SCHEME IN A NETWORK DIAGNOSTIC COMPONENT

(75) Inventors: Paul R. Gentieu, Sunnyvale, CA (US); Geoffrey T. Hibbert, San Jose, CA (US); Andrew J. Milne, Sierra Madre, CA (US); Roumel R. Garcia, Vallejo, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 398 days.

(21) Appl. No.: 11/675,036

(22) Filed: Feb. 14, 2007

(65) Prior Publication Data

US 2007/0192469 A1   Aug. 16, 2007

Related U.S. Application Data

(60) Provisional application No. 60/773,561, filed on Feb. 14, 2006.

(51) Int. Cl.
*G06F 15/16* (2006.01)
*G06F 15/173* (2006.01)

(52) U.S. Cl.
USPC ............ 709/247; 709/223; 709/224; 709/235

(58) Field of Classification Search
USPC ............ 709/247, 223; 455/423; 370/241, 252
See application file for complete search history.

(56) References Cited

U.S. PATENT DOCUMENTS

| | | |
|---|---|---|
| 5,304,990 A | 4/1994 | Rebourg et al. |
| 5,850,388 A * | 12/1998 | Anderson et al. ............. 370/252 |
| 5,946,301 A | 8/1999 | Swanson et al. |
| 6,011,778 A | 1/2000 | Kilkki et al. |
| 6,128,715 A * | 10/2000 | Wang et al. .................... 711/168 |
| 6,157,740 A * | 12/2000 | Buerkle et al. ................ 382/233 |
| 6,205,190 B1 | 3/2001 | Antonio et al. |
| 6,268,808 B1 | 7/2001 | Iryami et al. |
| 6,385,297 B2 | 5/2002 | Faulkner et al. |

(Continued)

FOREIGN PATENT DOCUMENTS

| | | |
|---|---|---|
| CN | 200780010952 | 9/2010 |
| EP | 07757009.1 | 8/2010 |

(Continued)

OTHER PUBLICATIONS

Dr. Thomas Porter: "The Perils of Deep Packet Inspection" SecurityFocus.com Jan. 11, 2005.

(Continued)

*Primary Examiner* — Rupal Dharia
*Assistant Examiner* — Mohammed Ahmed
(74) *Attorney, Agent, or Firm* — Volentine & Whitt, PLLC

(57) ABSTRACT

The embodiments disclosed herein relate to a network diagnostic component or device that is placed in-line between a first and second node. The diagnostic component or device is used to compress pre-specified Dwords of a network data stream. For example, the first node may communicate with the second node using a network data stream that includes a first component and a pre-specified component. In some embodiments, the network data stream may be of the SAS/SATA protocol. The network diagnostic component may receive the network data signal and associate the pre-specified component with an identifier that is represents the pre-specified component. The first component and the identifier representing the pre-specified component may then be recorded in a memory.

16 Claims, 3 Drawing Sheets

(56) References Cited

U.S. PATENT DOCUMENTS

| | | |
|---|---|---|
| 6,429,811 B1 | 8/2002 | Zhao et al. |
| 6,510,156 B1 | 1/2003 | Brock et al. |
| 6,526,362 B2 | 2/2003 | Jones et al. |
| 6,618,360 B1 | 9/2003 | Scoville et al. |
| 6,687,641 B2 | 2/2004 | Jones |
| 6,715,105 B1 | 3/2004 | Rearick |
| 6,868,495 B1 | 3/2005 | Glover |
| 7,103,050 B1 | 9/2006 | Luijten et al. |
| 7,281,167 B2 | 10/2007 | Dube |
| 7,539,489 B1 | 5/2009 | Alexander |
| 7,599,293 B1 | 10/2009 | Bain et al. |
| 2001/0039580 A1 | 11/2001 | Walker et al. |
| 2002/0064255 A1 | 5/2002 | Mohammadian et al. |
| 2002/0112044 A1* | 8/2002 | Hessmer et al. ............ 709/223 |
| 2003/0028509 A1 | 2/2003 | Sah et al. |
| 2003/0033397 A1* | 2/2003 | Gurumoorthy et al. ...... 709/223 |
| 2003/0081125 A1* | 5/2003 | Sheldon et al. ............ 348/180 |
| 2003/0142629 A1 | 7/2003 | Krishnamurthi et al. |
| 2003/0212694 A1 | 11/2003 | Potapov et al. |
| 2003/0224797 A1 | 12/2003 | Kuan et al. |
| 2004/0006574 A1 | 1/2004 | Witkowski et al. |
| 2004/0049596 A1 | 3/2004 | Schueler |
| 2004/0054776 A1 | 3/2004 | Klotz et al. |
| 2004/0057389 A1 | 3/2004 | Klotz et al. |
| 2004/0170383 A1 | 9/2004 | Mazur |
| 2004/0208501 A1* | 10/2004 | Saunders et al. ............ 398/9 |
| 2004/0215421 A1* | 10/2004 | Schmitz et al. ............ 702/183 |
| 2004/0225729 A1 | 11/2004 | Sabiers et al. |
| 2005/0060402 A1 | 3/2005 | Oyadomari et al. |
| 2005/0071445 A1* | 3/2005 | Siorek et al. ............ 709/223 |
| 2006/0061369 A1 | 3/2006 | Marks et al. |
| 2006/0095630 A1 | 5/2006 | Bashford et al. |
| 2006/0117189 A1* | 6/2006 | Chiu et al. ............ 713/189 |
| 2006/0153177 A1 | 7/2006 | Worrall et al. |
| 2006/0168207 A1 | 7/2006 | Choong et al. |
| 2006/0224822 A1 | 10/2006 | Blomquist et al. |
| 2007/0061681 A1 | 3/2007 | Carmichael |
| 2007/0124415 A1* | 5/2007 | Lev-Ran et al. ............ 709/217 |
| 2007/0299999 A1 | 12/2007 | Duerk et al. |
| 2008/0052586 A1 | 2/2008 | Rajski et al. |

FOREIGN PATENT DOCUMENTS

| | | |
|---|---|---|
| WO | WO 01/01272 | 1/2001 |
| WO | WO 02/087124 | 10/2002 |
| WO | PCT/US07/062162 | 6/2008 |

OTHER PUBLICATIONS

Sundaresan and Moussa, "Alogrithms and programming models for efficient representation of XML for Internet applications," Computer Networks (2002).
U.S. Appl. No. 11/675,045, Jul. 27, 2010, Office Action.
U.S. Appl. No. 11/675,041, Oct. 6, 2010, Office Action.
U.S. Appl. No. 12/061,356, filed Apr. 2, 2008, Kotturu et al.
U.S. Appl. No. 11/675,046, filed Feb. 14, 2007, Milne et al.
U.S. Appl. No. 11/675,045, filed Feb. 14, 2007, Vedanabhatla et al.
U.S. Appl. No. 11/675,041, filed Feb. 14, 2007, Vedanabhatla et al.
Working Draft American National Standard, Serial Attcahed SCSI-1.1 (SAS-1.1)' Specification, Revision Mar. 4, 2004.
Compression and Decompressing Data Using Java APIs' by Mahmoud et al., Feb. 2002.
LeCroy's 'SASTracker' Datasheet, copyright 2006.
LeCroy's 'SAS InFusion and SATA in Fusion Error Injector and Traffic Modifier' Datasheet, copyright 2005.
Penokie, George, Alternate SAS Speed Negotiation State Diagram, Oct. 10, 2002, T10/02-405 Rev. 0, T10 Committee (SCSI).
Elliot, Rob, Serial Attached SCSI Phy Layer, Sep. 30, 2003, HP Industry Standard Servers, SCSI Trade Association.
U.S. Appl. No. 11/675,046, Mar. 19, 2010, Final Office Action.
U.S. Appl. No. 11/675,046, Jul. 7, 2009, Office Action.
U.S. Appl. No. 11/675,045, Mar. 23, 2010, Final Office Action.
U.S. Appl. No. 11/675,045, Jul. 17, 2009, Office Action.
U.S. Appl. No. 11/675,045, Oct. 29, 2008, Office Action.
U.S. Appl. No. 11/675,041, Mar. 2, 2010, Final Office Action.
U.S. Appl. No. 11/675,041, Jun. 24, 2009, Office Action.

* cited by examiner

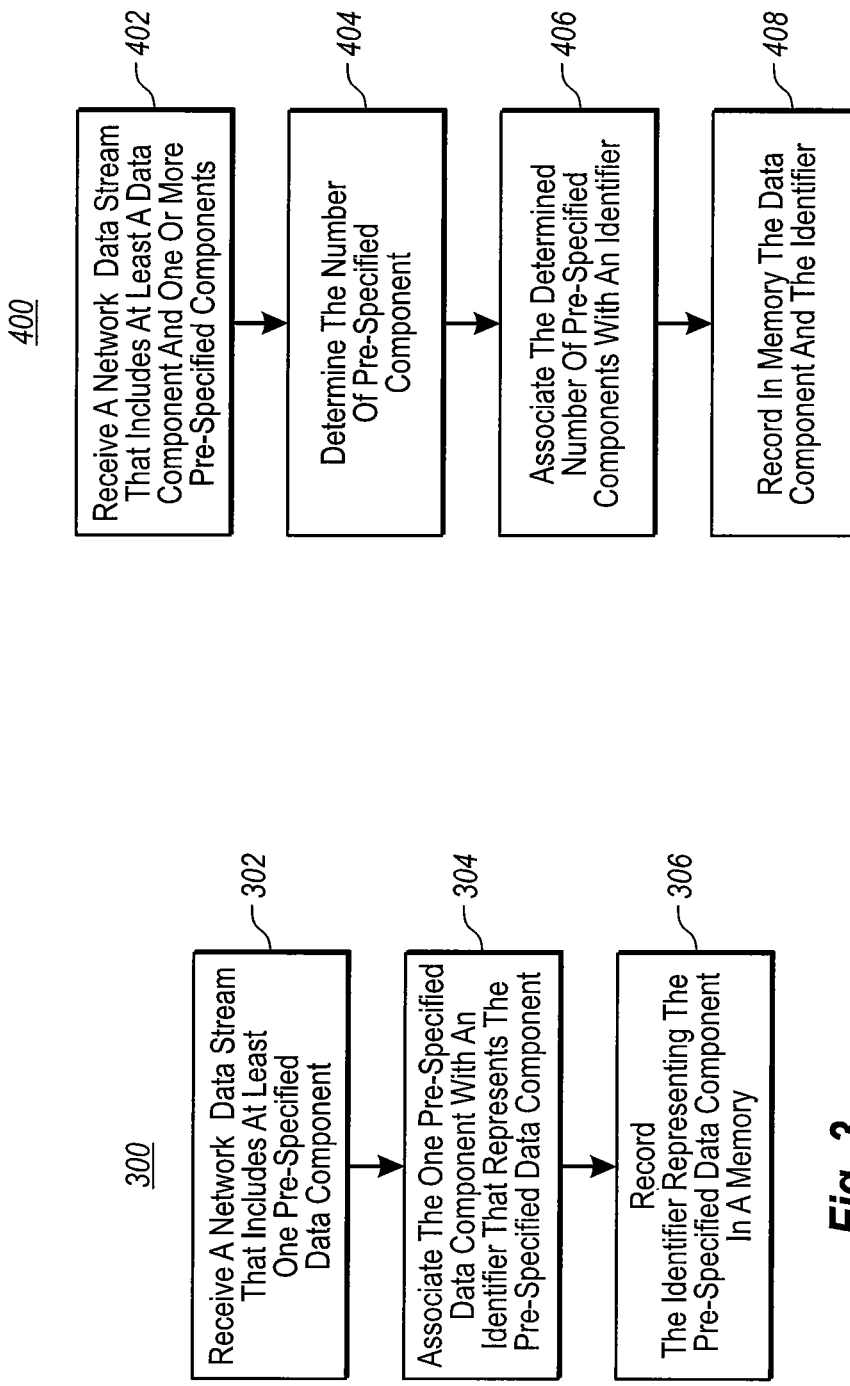

ALIGN/NOTIFY COMPRESSION SCHEME IN A NETWORK DIAGNOSTIC COMPONENT

CROSS-REFERENCE TO RELATED APPLICATIONS

This application claims the benefit of U.S. Provisional Application No. 60/773,561, filed Feb. 14, 2006, which is incorporated herein by reference in its entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic device or component that is placed in-line between two nodes in a network to compress primitive fill Dwords. For example, in one embodiment the network diagnostic component receives a network data stream from a first node for communication with a second node. The network data stream includes at least one pre-specified data component.

The network diagnostic component associates the one pre-specified data component with an identifier that represents the one pre-specified data component. The network diagnostic component then records the identifier representing the pre-specified data component in a memory.

In additional embodiments, the network diagnostic component receives a network data stream that includes at least a data component and one or more pre-specified components. The network diagnostic component determines the number of pre-specified components and associates the determined number with an identifier. The network diagnostic component records in memory the data component and the identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates a method for a network diagnostic component placed in-line between two nodes to compress primitive fill Dwords; and FIG. 4 illustrates an additional method for a network diagnostic component placed in-line between two nodes to compress primitive fill Dwords.

DETAILED DESCRIPTION

The embodiments disclosed herein relate to a network diagnostic component or device that is placed in-line between a first and second node. The diagnostic component or device is used to compress pre-specified Dwords of a network data stream. For example, the first node may communicate with the second node using a network data stream that includes a first component and a pre-specified component. In some embodiments, the network data stream may be of the SAS/SATA protocol. The network diagnostic component may receive the random network data signal and associate the primitive fill component with meta-data that is represents the primitive fill component. The first component and the meta-data representing the primitive fill component may then be recorded in a memory.

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described. Note that as used herein the terms "first", "second" and so forth are not intended to imply sequential ordering, but rather are intended to distinguish one element from another.

Example Networking System

Figure 1:
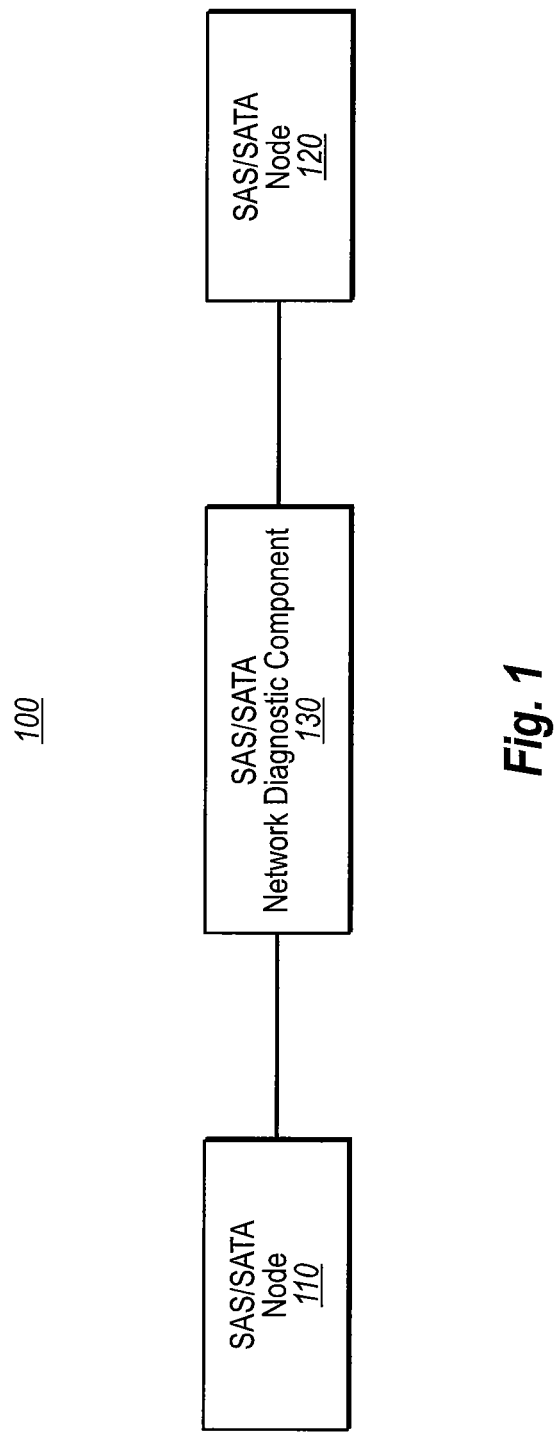
FIG. 1 illustrates a block diagram of a network including a network diagnostic component placed in-line between two nodes.

FIG. 1 is a block diagram of a networking system 100. The networking system 100 may include one or more nodes 110, 120, which communicate with each other via a network. As used herein, a "node" includes, but is not limited to, a server or host; a client or storage device; a switch; a hub; a router; all or a portion of a SAN fabric; a diagnostic device; and any other device or system, or combination thereof, that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; any unit of data capable of being routed (or otherwise transmitted) through a computer network; and the like. In one embodiment, a network message or data stream may comprise transmission characters used for data purposes, protocol management purposes, code violation errors, and the like.

Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110,120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110,120 need not be SATA/SATA nodes and that the nodes 110,120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110,120 such that network messages sent between the nodes 110,120 are available to network diagnostic component 130 and/or are routed through the network diagnostic component 130. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110,120. The network diagnostic component 130 may also retransmit those network messages. In particular, the network diagnostic component 130 may receive network messages sent from the node 110 and then retransmit them to the node 120. Also, the network diagnostic component 130 may receive network messages sent from the node 120 and then retransmit them to the node 110.

Prior to retransmitting these network messages, the network diagnostic component 130 can modify the signal used to transmit the network messages. For example, the network diagnostic component 130 may digitally retime the signal, may modify the content of the messages themselves, or both. It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110,120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

Example ALIGN/NOTIFY Compression Module

ALIGN and NOTIFY primitive Dwords (also hereinafter simply referred to as "primitives") occur frequently in the SAS and SATA protocols. These pre-specified primitive Dwords are typically used for the following functions: Out-of-band (OOB) signals, character and Dword alignment, clock skew management, and rate matching.

ALIGN and NOTIFY primitives occur most frequently, however during rate matching, which is used when the actual physical link rate is faster than the negotiated connection rate between two SAS or SATA nodes. Typically, the slower negotiated connection rate is 1.5 Gigabits per second (gbps), and the actual physical link rate is 3.0 gbps or 6.0 gbps. A PHY device translates between these rates by interleaving Data Dwords with ALIGN or NOTIFY primitive Dwords. The new data stream is then transmitted onto the faster link. An example of this interleaving is shown below:

1.5 gbps data stream: |Data 0|Data 1|Data 2| . . .

3.0 gbps data stream: |ALIGN|Data 0|ALIGN|Data 1|ALIGN|Data 2| . . .

In this example, the data transfer rate of the 3.0 gbps link is the same as that of the 1.5 gbps link, as an ALIGN primitive has been inserted into every other time slot in the 3.0 gbps link. In a similar fashion, rate matching from 1.5 gbps to 6.0 gbps inserts three ALIGN primitives for every Data Dword.

A single ALIGN primitive has been shown in the above example for simplicity. However, there are eight primitive Dwords that can be used as rate-matching Dwords: four types of ALIGN and four types of NOTIFY primitives. These are listed below in Table 1.

TABLE 1

| Primitive | Value |
|---|---|
| ALIGN (0) | K28.5 D10.2 D10.2 D27.3 |
| ALIGN (1) | K28.5 D07.0 D07.0 D07.0 |
| ALIGN (2) | K28.5 D01.3 D01.3 D01.3 |
| ALIGN (3) | K28.5 D31.3 D31.3 D31.3 |
| NOTIFY (ENABLE SPINUP) | K28.5 D31.3 D31.3 D31.3 |
| NOTIFY (RESERVED 0) | K28.5 D31.3 D07.0 D07.0 |
| NOTIFY (RESERVED 1) | K28.5 D31.3 D07.0 D01.3 |
| NOTIFY (RESERVED 2) | K28.5 D31.3 D10.2 D10.2 |

In addition to their frequent use in rate matching, ALIGN/NOTIFY primitives also occur regularly on the link at a rate of two primitives every 256 Dwords in the SATA protocol, and two primitives every 4096 Dwords in the SAS protocol. They are also transmitted continuously during OOB sequences.

The large number of ALIGN/NOTIFY primitives used during rate matching and other functions, however, may cause a strain on available memory in network diagnostic component 130. Accordingly, embodiments disclosed herein describe compression schemes that may be implemented in network diagnostic component 130 to help network diagnostic component 130 realize significant memory savings.

In one embodiment, referred to herein as lossless compression, information about the ALIGN and NOTIFY primitives on the link is preserved. This embodiment may be used if a user of network diagnostic component 130 desires to reconstruct the exact bit sequence that occurs on the link.

In another embodiment, referred to herein as lossy compression, information about the specific ALIGN and NOTIFY primitives that occurred is not recorded in memory. This embodiment may be used to achieve higher compression in the case where a user does not care about the exact bit sequence, but only about the information conveyed.

Figure 2:
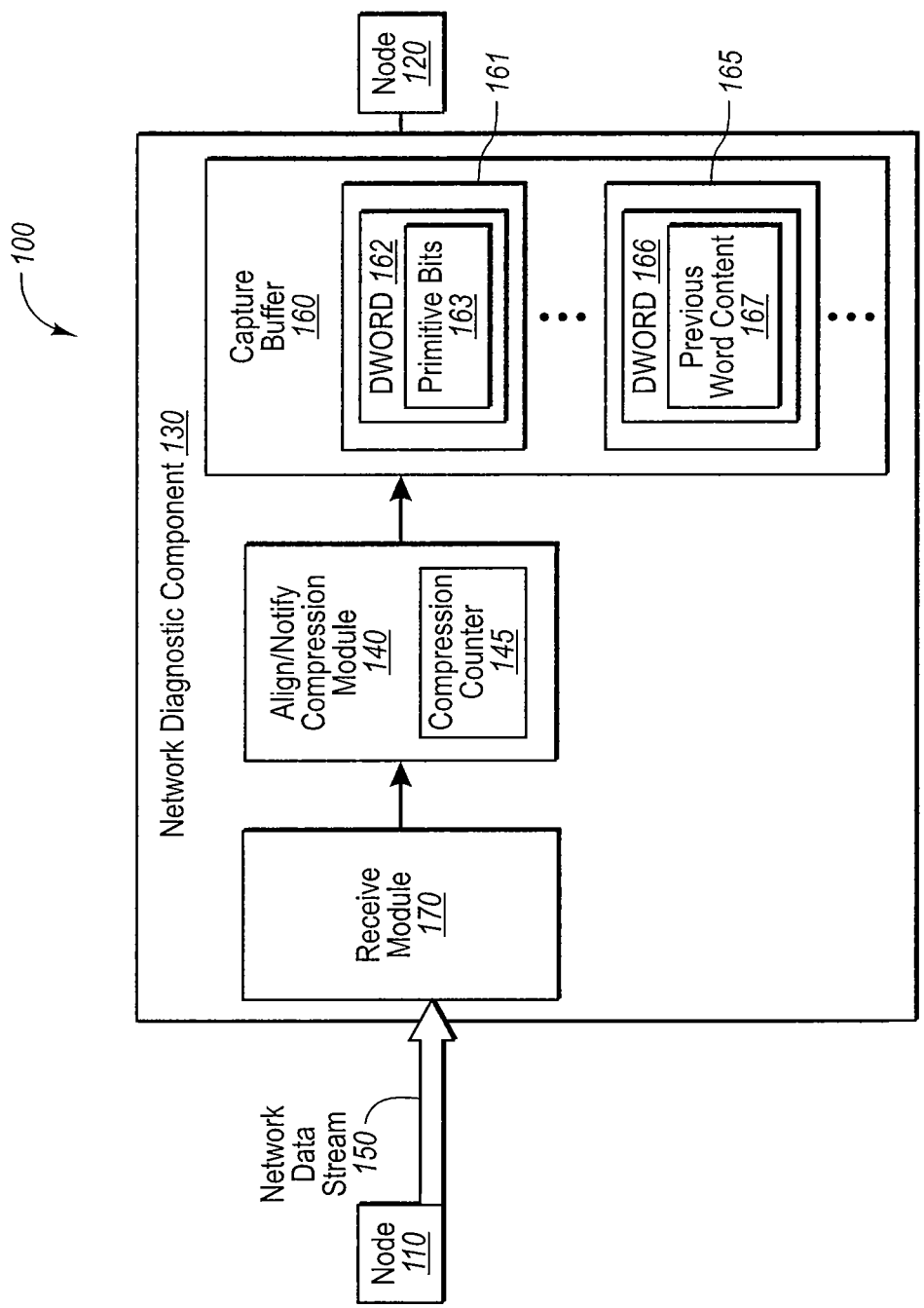
FIG. 2 illustrates a detailed view of a particular embodiment of the network diagnostic component of FIG. 1.

The embodiments disclosed herein will be described with reference to FIG. 1, which was previously described, and FIG. 2, which shows a detailed view of one particular embodiment of network diagnostic component 130. Note that the embodiment of FIG. 2 is only one of numerous examples of a network diagnostic component 130 that can be used to implement the embodiments disclosed herein. Although the following embodiments will be described using the SAS and SATA protocols, this is by way of example only and should not be used to limit the scope of the appended claims. Other suitable protocols may also be utilized by the embodiments disclosed herein FIG. 2 illustrates that network diagnostic component 130 is shown to include a receive module 170, an ALIGN/NOTIFY compression module 140 and a capture buffer 160. The ALIGN/NOTIFY compression module 140, which may be a trace formatting/compression engine, may be implemented as software, hardware, or any combination of the two. The capture buffer 160 may be any reasonable persistent and/or non-persistent memory source.

In operation, receive module 170 receives a network data stream 150 from node 110 that may include data Dwords interleaved with pre-specified ALIGN and/or NOTIFY primitive Dwords. The data stream is then provided to ALIGN/NOTIFY compression module 140, where the compression operation occurs as will be explained in further detail below. The compression module 140 then creates a capture record 161 in capture buffer 160 as will be explained with more detail to follow. Note that although the following examples show that node 110 is the transmitting node, this is by way of example only. Node 120 may also be the transmitting node in some embodiments. Also note that although the following examples illustrate the use of ALIGN primitives, NOTIFY primitives may also be used.

Lossless Compression

In one example embodiment, lossless compression may be achieved by defining 4 extra bits in capture buffer 160 to indicate the presence of an ALIGN or NOTIFY primitive in the previous Dword that occurred on the link. For instance, a capture record 161 in capture buffer 160 may contain 32 bits for the current Dword 162, and four "Previous Primitive" bits 163. Note that the ellipses underneath capture record 161 represent that there may be any number of capture records 161 that include a current Dword 162 and four previous primitive bits 163 as circumstance warrant. The previous primitive bits may be defined as illustrated in Table 2. Of course one of skill in the art will recognize that the primitive bits 163 may also be used to define other pre-specified primitive Dwords or other types or Dwords.

TABLE 2

| "Previous Primitive" bits | Meaning |
|---|---|
| 1000 | ALIGN(0) occurred in the previous Dword |
| 1001 | ALIGN(1) occurred in the previous Dword |
| 1010 | ALIGN(2) occurred in the previous Dword |
| 1011 | ALIGN(3) occurred in the previous Dword |
| 1100 | NOTIFY(ENABLE SPINUP) occurred in the previous Dword |
| 1101 | NOTIFY(RESERVED 0) occurred in the previous Dword |
| 1110 | NOTIFY(RESERVED 1) occurred in the previous Dword |
| 1111 | NOTIFY(RESERVED 2) occurred in the previous Dword |

For example, using a commonly known encoding scheme such as 8b/10B encoding, the Dwords comprising network data stream 150 would typically be transmitted as 40 bits on the wire. In many conventional capture schemes, the 40 bit Dwords are captured and stored as a 64 bit record. In other words, there are 24 bits of additional data such as meta-data added in the record. In a network data stream 150 that included 10 Dwords, this would mean that 400 raw bits on the wire would be stored as 640 bits in a capture memory Advantageously, by implementing the lossless compression scheme of the present invention, the same 400 bits on the wire may be compressed to 320 bits in the capture buffer 160. This is illustrated in Table 3

TABLE 3

| Network data stream 150 before compression by compression module 140 | Capture Records 161 including the current Dword 162 and previous primitive bits 163 after compression |
|---|---|
| ALIGN(0) | [Data 0][1000] |
| Data 0 | |
| ALIGN(1) | [Data 1][1001] |
| Data 1 | |
| ALIGN(2) | [Data 2][1010] |
| Data 2 | |
| ALIGN(3) | [Data 3][1011] |
| Data 3 | |
| ALIGN(2) | [Data 4][1010] |
| Data 4 | |

As illustrated, each capture record 161 contains the current Data Dword 162 and four bits 163 indicating the type of ALIGN or NOTIFY that occurred in the previous Dword. The record 161 will be stored as a 64 bit record, which is in contrast to the conventional method of using a 64 bit record for the Data Dword and a 64 bit record for the ALIGN primitive Dword. Thus, as mentioned above, the 400 bits on the wire may be compressed to 320 bits in the capture buffer 160. This compression scheme, as well as the compression schemes to be discussed in relation to Tables 4 and 5, are considered lossless as the original data stream 150 received by network diagnostic component 150 may be reconstructed exactly as it was received.

In other embodiments, ALIGN/NOTIFY compression module 140 is able to compress a network data stream 150 subjected to rate matching from 1.5 gbps to 6 gbps as described above. In this case, ALIGN/NOTIFY compression module 140 may write an ALIGN or NOTIFY primitive as the current Dword 162 in capture record 161. In this case, the raw data on the wire would be 480 bits. The lossless compression scheme would generate capture records 161 that were 64 bit records including the current Dword 162 and the previous primitive bits 163. Thus, the 480 bits on the wire may be compressed to 384 bits in the capture buffer 160. This compression is illustrated in Table 4.

TABLE 4

| Network data stream 150 before compression by compression module 140 | Capture Records 161 including the current Dword 162 and previous primitive bits 163 after compression |
|---|---|
| ALIGN(0) | |
| ALIGN(1) | |
| ALIGN(2) | [ALIGN(1)][1000] |
| Data 0 | [Data 0][1010] |
| ALIGN(3) | |
| ALIGN(0) | [ALIGN(0)][1011] |
| ALIGN(1) | [Data 1][1001] |
| Data 1 | |
| ALIGN(2) | [ALIGN(3)][1010] |
| ALIGN(3) | |
| ALIGN(0) | [Data 2][1000] |
| Data 2 | |

In alternative embodiments, compression module 140 may compress a network data stream 150 subjected to rate matching from 1.5 gbps to 6 gbps by adding an additional set of four "Previous Primitive" bits 163 to each capture record 161. In this case there is 480 raw bits on the wire. The lossless compression scheme would generate capture records 161 that included two 64 bit records including the two current Dwords 162 and the two previous primitive bits 163. Thus, the 480 bits on the wire may be compressed to 384 bits in the capture buffer 160. This is illustrated in Table 5.

TABLE 5

| Network data stream 150 before compression by compression module 140 | Capture Records 161 including the current Dword 162 and previous primitive bits 163 after compression |
|---|---|
| ALIGN(0) | [ALIGN(1)][1000] |
| ALIGN(1) | [Data 0][1010] |
| ALIGN(2) | |
| Data 0 | |
| ALIGN(3) | [ALIGN(0)][1011] |
| ALIGN(0) | [Data 1][1001] |
| ALIGN(1) | |
| Data 1 | |
| ALIGN(2) | [ALIGN(3)][1010] |
| ALIGN(3) | [Data 1][1000] |
| ALIGN(0) | |
| Data 2 | |

Lossy Compression

As an alternative to lossless compression, embodiments of network diagnostic component 130 may implement a lossy compression scheme. In such embodiments, the number pre-specified data such as the number of ALIGN and/or NOTIFY primitives, and the not the actual primitive Dwords, are captured in capture buffer 160 along with the current Data Dword. A compression counter 145, which may be implemented as part of compression module 140 in some embodiments, may be used to count the number of ALIGN/NOTIFY primitive fill words. Note that compression counter 145 may be any reasonable counter. Also note that this type of compression scheme is lossy as the original data stream 150 received by network diagnostic component 150 may not be reconstructed exactly as it was received.

For instance, a capture record 165 in capture buffer 160 may contain the current Dword 166 and four bits 167 that indicate the presence of up to seven previous dwords. Note that the ellipses under capture record 165 represent that there may be any number of capture records 165 that include a current Dword 166 and previous dword bits 167 as circumstance warrant. Also note that although the following example illustrates ALIGN primitives, NOTIFY primitives as well as other primitive and non-primitive dwords may also be used. The four bits that indicate the presence of up to seven previous fill words may be defined as illustrated in Table 6.

TABLE 6

| Previous word bits | Meaning |
| --- | --- |
| 0000 | No previous pre-specified words |
| 0001 | 1 previous pre-specified word before current Dword |
| 0010 | 2 previous pre-specified words before current Dword |
| 0011 | 3 previous pre-specified words before current Dword |
| 0100 | 4 previous pre-specified word before current Dword |
| 0101 | 5 previous pre-specified word before current Dword |
| 0110 | 6 previous pre-specified words before current Dword |
| 0111 | 7 previous pre-specified words before current Dword |

A network data stream 150 subjected to rate matching from 1.5 gbps to 6 gbps as illustrated above with respect to Table 5 may be compressed by compression module 140 using a lossy compression scheme as shown in Table 7. For example, network data stream 150 of Table 7 would be 360 bits on the wire. The lossy compression scheme of the present invention would generate capture records 165 that included a 64 bit record including the current Dwords 166 and the previous word content 167. Thus, the 360 bits on the wire may be compressed to 192 bits in the capture buffer 160 by filtering out the previous pre-specified words.

TABLE 7

| Network data stream 150 before compression by compression module 140 | Capture Records 165 including the current Dword 166 and pre-specified word bits 167 after compression |
| --- | --- |
| ALIGN(0)<br>Data 0 | [Data 0][0001] |
| ALIGN(1)<br>ALIGN(2)<br>Data 1 | [Data 1][0010] |
| ALIGN(3)<br>ALIGN(0)<br>ALIGN(1)<br>Data 2 | [Data 2][0011] |

Some embodiments of network diagnostic component 130 may be configured to perform both the lossless and lossy compression schemes previously described. The choice of compression scheme may be dynamically selectable by the user of the network diagnostic component 130 in such embodiments by any means known in the art. In addition, the lossy design of the present invention allows for the filtering out of any dword and is not limited to ALIGN and NOTIFY primitive dwords.

Example Methods of ALIGN/NOTIFY Compression

Referring now to FIG. 3, a flowchart of a method 300 for an in-line diagnostic component to compress pre-specified data Dwords is illustrated. Method 300 will be described in relation to the network system of FIGS. 1 and 2, although this is not required. It will be appreciated that method 300 may be practiced in numerous diagnostic network systems.

Method 300 includes an act of receiving a network data stream for communication between the first and second nodes that includes at least one pre-specified data component (act 302). For example, network diagnostic component 130, specifically receive module 170, may receive network data stream 150 from either node 110 or node 120, which may be SAS/SATA devices. In some embodiments, the pre-specified data component may be a primitive Dword such as an ALIGN or NOTIFY Dword.

Method 300 also includes an act of associating the one pre-specified data component with an identifier that represents the one pre-specified data component (act 304). For example, random data compression module 140, or other component of network diagnostic component 130, may associate an identifier with the pre-specified data component. In some embodiments, the identifier may be four bits that identify the pre-specified data component, such as primitive bits 163.

Method 300 further includes an act of recording the identifier associated with the pre-specified data component in a memory (act 306). For example, network diagnostic component 130, which may be a SAS/SATA network diagnostic device, may record the identifier in capture buffer 160. Specifically, ALIGN/NOTIFY compression module 140 may record primitive bits 163 as a capture record 161 that is stored in capture buffer 160.

In some embodiments, the network data stream may also include Data Dwords that are interleaved with the pre-specified data components or Dwords. In such embodiments, a record of the Data Dwords may also be recorded in capture buffer 160. For a capture record of the current Dword 162 may be included as part of capture record 161.

In some embodiments, the contents of records 161 may be displayed by a display device attached to network diagnostic component 130 to allow for user interaction. In further embodiments, the network data stream 150 may include up to three pre-specified data components along with the at least one data Dword component such embodiment, a second identifier that represents the three pre-specified data components may be associated with the three pre-specified data components. These may then all be written by compression module 140 into capture buffer 160.

Referring to FIG. 4, a flowchart of an additional method 400 for an in-line diagnostic component to compress pre-specified data Dwords is illustrated. Method 400 will be described in relation to the network system of FIGS. 1 and 2, although this is not required. It will be appreciated that method 400 may be practiced in numerous diagnostic network systems.

Method 400 includes an act of receiving a network data stream for communication between the first and second nodes that includes at least a data component and one or more pre-specified data components (act 402). For example, network diagnostic component 130, specifically receive module 170, may receive network data stream 150 from either node 110 or node 120, which may be SAS/SATA devices. In some embodiments, the data component may be any Data Dword received from nodes 110 or 120. Further, the pre-specified data Dword may be an ALIGN or NOTIFY Dword.

Method 400 also includes an act of determining the number of pre-specified data components (act 404). For example, network diagnostic component 130 may determine the number of pre-specified data components interspersed between data components in network data stream 150. In some embodiments, a compression counter 145 counts the number of ALIGN and/or NOTIFY primitive Dwords that precede a Data Dword.

Method 400 further includes an act of associating the determined number of pre-specified data components with an identifier (act 406). For example, ALIGN/NOTIFY compression engine 140, or some other component of network diagnostic component 130, may associate the number of pre-specified data components determined in act 404 with the identifier. In some embodiments, the identifier may be four bits such as previous word count 167 that represent the number of pre-specified data components, although other number of bits may also be used as the identifier.

Method 400 additionally includes an act of recording in a memory the data component and the identifier (act 408). For example, network diagnostic component 130, which may be a SAS/SATA network diagnostic device, may record a data component and the identifier in capture buffer 160. Specifically, ALIGN/NOTIFY compression module 140 may record the current Data Dword 166 and previous word count 167 as capture record 165 in capture buffer 160.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receive a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety Example Systems It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, sending information to a client software program, or both. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for a network diagnostic component that is placed in-line between first and second nodes in a network to compress pre-specified primitive Dwords, the method comprising:

an act of receiving a network data stream for communication between the first and second nodes, wherein the network data stream comprises Data Dwords interspersed with at least one pre-specified primitive Dword, wherein the Data Dwords include data being transmitted from the first node to the second node and the at least one primitive Dword includes information that is used to configure the communication between the first and second node;

an act of associating the at least one pre-specified primitive Dword with an identifier value that represents the at least one pre-specified primitive Dword, wherein the identifier value for the at least one pre-specified primitive Dword is specific to the at least one primitive Dword and is different from the identifier values for other primitive Dwords;

an act of replacing the at least one pre-specified primitive Dword with the identifier value, and recording, as part of a compression capture record along with the Data Dwords, the identifier value representing the at least one pre-specified primitive Dword in a memory in place of the at least one pre-specified primitive Dword represented by the identifier value using fewer bits than the pre-specified primitive Dword, such that the at least one pre-specified primitive Dword represented by the identifier value is not recorded as part of the compression capture record for saving memory;

conducting network diagnostic functions on the compression capture record;

reconstructing the network data stream with the primitive Dwords; and transmitting the network data stream to the second node, wherein the step of reconstructing the network data stream comprises reconstructing the exact data stream received from the first node.

2. The method in accordance with claim 1, wherein the at least one pre-specified primitive Dword is an ALIGN or NOTIFY primitive Dword.

3. The method in accordance with claim 1, wherein the network diagnostic component is a SAS/SATA network diagnostic component.

4. The method in accordance with claim 1, wherein the identifier comprises four bits that identify the at least one pre-specified primitive Dword.

5. The method in accordance with claim 1, wherein at least one Data Dword is preceded by a plurality of pre-specified primitive Dwords, the method further comprising:
   an act of associating the identifier value with the plurality of pre-specified primitive Dwords, wherein the identifier value uniquely represents the plurality of pre-specified primitive Dwords;
   an act of replacing the pre-specified primitive Dwords with the identifier value; and
   an act of recording the at least one Data Dword and the identifier value in the memory, such that the plurality of pre-specified primitive Dwords, represented by the identifier value, are not stored in the memory.

6. A network diagnostic device placed in-line between first and second nodes in a network comprising:
   a processor;
   a memory;
   a first module configured to receive a network data stream for communication between the first and second nodes, wherein the network data stream comprises Data Dwords interspersed with one or more pre-specified data primitive Dwords, wherein the Data Dwords include data being transmitted from the first node to the second node, and the primitive Dwords include information that is used to configure the communication between the first node and the second node;
   a second module configured to associate a first one of the pre-specified primitive Dwords with a first identifier value that represents the first pre-specified primitive Dword with fewer bits than the first pre-specified primitive Dword to save memory, wherein the first identifier value for the first pre-specified primitive Dword is specific to that primitive Dword and is different from identifier values from other primitive Dwords;
   a third module configured to replace the first primitive Dword with the first identifier value, and to generate a compression capture record in the memory of a Data Dword that follows the first pre-specified primitive Dword and the first identifier value representing the first pre-specified specified primitive Dword, such that the first pre-specified primitive Dword, represented by the first identifier value, is not recorded in the compression capture record in the memory;
   a fourth module for conducting network diagnostic functions on the compression capture record; and
   a fifth module for reconstructing the network data stream with the primitive Dwords; and for transmitting the network data stream to the second node,
   wherein the fifth module reconstructs the exact data stream received from the first node.

7. The network diagnostic device in accordance with claim 6, wherein the first and second nodes are SAS/SATA nodes and the network diagnostic component is a SAS/SATA network component.

8. The network diagnostic device in accordance with claim 6, wherein the fourth module is one of a bit error rate tester, a protocol analyzer, a generator, a jammer, and a monitor.

9. The network diagnostic device in accordance with claim 6, wherein the first module is a state machine.

10. The network diagnostic device in accordance with claim 6, wherein the second and third modules are the same module.

11. The network diagnostic device in accordance with claim 6, wherein the first pre-specified primitive Dword is an ALIGN or NOTIFY primitive Dword.

12. The network diagnostic device in accordance with claim 6, wherein the network diagnostic device is further configured to associate a second identifier with a plurality of pre-specified primitive Dwords and to record the second identifier value and the Data Dword, which follows the plurality of pre-specified primitive Dwords in the memory.

13. A method for a network diagnostic component that is placed in-line between first and second nodes in a network to compress pre-specified Dwords, the method comprising:
   an act of receiving a network data stream for communication between the first and second nodes, wherein the network data stream comprises at least a Data Dword that is preceded by one or more pre-specified primitive Dwords, wherein each Data Dword includes data being transmitted from the first node to the second node, and the one or more pre-specified primitive Dwords include information that is used to configure the communication between the first and second nodes;
   an act of determining the number of pre-specified primitive Dwords;
   an act of associating the determined number of pre-specified primitive Dwords with an identifier value with fewer bits than the one or more pre-specified primitive Dwords;
   replacing the one or more pre-specified primitive Dwords with the identifier value;
   an act of recording a compression capture record in a memory comprising each Data Dword and each identifier value, such that the determined number of pre-specified primitive Dwords, represented by the identifier value, are not stored in the memory to save memory;
   conducting network diagnostic functions on the compression capture record
   reconstructing the network data stream with the primitive Dwords; and
   transmitting the network data stream to the second node,
   wherein the step of reconstructing the network data stream comprises reconstructing the exact data stream received from the first node.

14. The method in accordance with claim 13, wherein the one or more pre-specified primitive Dwords are ALIGN or NOTIFY primitive Dwords.

15. The method in accordance with claim 13, wherein the first and second nodes are SAS/SATA nodes and the network diagnostic component is a SAS/SATA network component.

16. The method in accordance with claim 13, wherein the identifier value comprises one or more bits that represent the number of pre-specified primitive Dwords.

* * * * *